Sept. 27, 1955     W. J. MORDARSKI ET AL     2,719,017

SHOCK MOUNTS

Filed Sept. 27, 1952

INVENTORS
Walter J. Mordarski
and William H. Spencer
BY Rockwell & Bartholow
ATTORNEYS United States Patent Office 2,719,017
Patented Sept. 27, 1955

2,719,017

SHOCK MOUNTS

Walter J. Mordarski, Meriden, and William H. Spencer, East Haven, Conn., assignors to The Connecticut Hard Rubber Company, New Haven, Conn., a corporation of Connecticut Application September 27, 1952, Serial No. 311,832

1 Claim. (Cl. 248—24)

This invention relates to shock mounts and more particularly to an anti-shock or anti-vibration mounting for heavy objects during transportation thereof.

It sometimes occurs that when heavy objects are transported from place to place the shocks and vibrations to which they are subjected cause damage to parts of the mechanism. This is true, for example, when such objects as engines or other machinery having delicate bearings are transported from place to place by rail or truck. This has resulted in damage to the bearings which might have been avoided if the engine or other mechanism had been mounted on suitable supports which could withstand vibration and shock without placing too high a peak load on the mounted unit.

It is desirable in constructing a support or mount for the described purpose to provide a structure that will absorb a large amount of energy without placing too high a peak load upon the mounted unit and without making the resilient element so soft as to allow excessively large deflections and very low natural frequencies. In the present instance a rubber or rubber-like material is employed between two concentric cylindrical members, one of the members serving as a supporting member and the other serving as the supported member or the member carrying the load. The rubber or other resilient material between these inner and outer members is so shaped that when a load-deflection curve is plotted, the curve will tend to flatten out when a load of a predetermined amount is reached, the deflection increasing rapidly from this point with a small increase of load.

As the energy absorbed by the mount is equal to the load times the deflection, it will be seen that when the load-deflection curve is substantially flat, a large amount of energy is absorbed without placing too great a peak load on the mounted unit.

It will be noted that the lower surface of the rubber portion of the mounting is inclined upwardly from its lower point of connection with the outer member to the lower point of connection with the inner member so that the lower surface of the rubber or rubber-like portion is generally frustoconical in shape. When the load is placed upon the inner member, for example, the downward force of this load tends to exert a force of compression upon the rubber, the inner member being deflected or being moved downwardly. Thus the rubber is first placed under compression and shear as the lower surface of the rubber portion of the mounting tends to flatten out. As the compression load increases still more, the rubber is placed under tension and shear.

Tests have shown that the shape of the upper surface of the rubber portion of the mount is not critical, at least not as critical as that of the lower surface. It is, however, important that the lower surface slope upwardly so that the effect described above is obtained. For example, if the outer cylindrical supporting member is approximately 6 inches in diameter and the inner or supported member is one fifth or one sixth of that amount, the lower end of the latter should be substantially from two to three and one-half inches above the lower surface of the outer member so as to give a sufficient inclination to the lower surface of the rubber disposed between the two members to bring about the desired result.

One object of the invention is to provide a new and improved resilient mounting for supporting a load to prevent shock or vibration damage to the supported load.

Still another object of the invention is to provide a mounting for supporting a load which is subject to shock or vibration so that a large amount of energy will be absorbed by the mount without placing too great a peak load on the mounted unit.

To these and other ends the invention consists in the novel features and combinations of parts to be hereinafter described and claimed.

Figure 1:
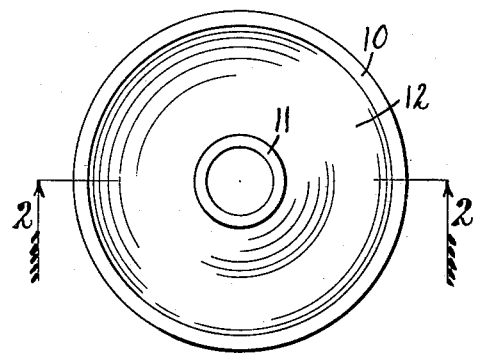
Fig. 1 is a top plan view of a mounting embodying our invention.
Figure 2:
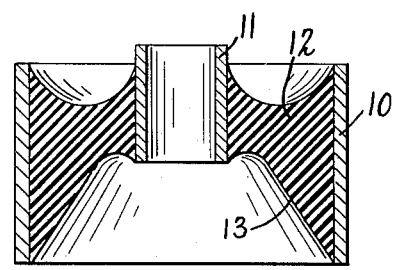
Fig. 2 is a sectional view on line 2—2 of Fig. 1.

To illustrate one preferred embodiment of our invention, we have shown in Figs. 1 and 2 of the drawings a rubber mount consisting of an outer cylindrical member 10 having a hollow interior and being in the form of a pipe. Within this member is disposed in concentric relation a smaller hollow cylindrical member 11, the outside diameter of the latter being sufficiently small with respect to the inside diameter of the member 10 so that a considerable space exists between them.

Within this space is a body of rubber or rubber-like resilient material 12, the rubber being in the form of an annulus, the outer surface of which is bonded to the outer member 10, while the inner surface is bonded to the outer surface of the inner member 11.

It will be noted that the lower surface of the rubber 12 is inclined upwardly, as shown at 13, this resulting from the fact that the lower edge of the rubber portion 12 of the mount, where it is bonded to the outer member 10, is at a considerably lower level than the point where the inner portion of the rubber is bonded to the lower portion of the inner member 11. That is to say, the inner member 11 is offset upwardly with respect to the outer member 10 so that its lower end stands above the lower end of the outer member when the body of rubber or other resilient elastomer is bonded to the lower ends of the two members.

Although these dimensions may be varied, the lower end of the inner member is offset upwardly substantially one third to one half of the diameter of the outer member.

If it be assumed that the load to be supported is placed upon the inner member, it will be seen that the downward force of this load will result in a compression and shear load upon the body 12 of the mounting. This tends to compress the resilient material between the inner and outer members. This compression and shear load will continue until the inner member 11 is depressed to a sufficient extent to pass what may be termed a "dead center" after which the greater part of the rubber portion of the mount will be under tension. From this point on, the deflection becomes greater with comparatively small increase in load. Thus the mount provides for the absorption of a large amount of energy compared to the peak load carried by the rubber portion of the mounting, at large deflections.

Figure 3:
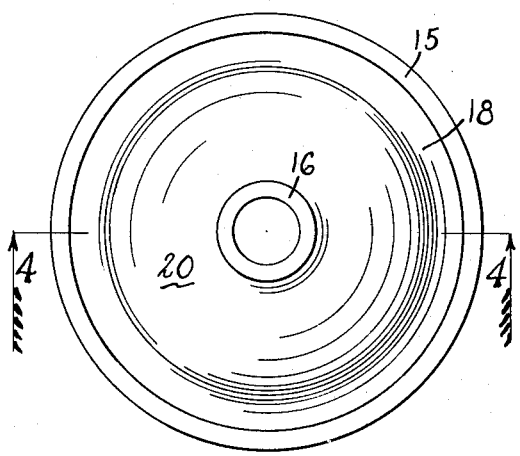
Fig. 3 is a view similar to Fig. 1 showing a modified form of our invention.
Figure 4:
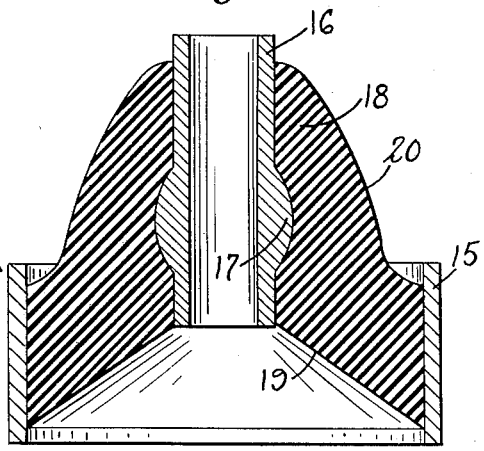
Fig. 4 is a sectional view on line 4—4 of Fig. 3.

In Figs. 3 and 4 of the drawing, we have shown a similar structure which has also given satisfactory results under test. In this case the outer member 15 is similar to the member 10 described above. The inner supported member 16 is, however, considerably longer than the member 11 and is provided with an annular enlarged portion or bulge 17 intermediate its ends so that it will be firmly bound to the resilient rubber or rubber-like annular member 18. The lower surface of the rubber portion 19 also is inclined upwardly and inwardly from its outer edge and the upper surface 20 is inclined at even a steeper angle owing to the fact that the shape of the rubber annulus 18 is such that its inner portion is considerably thicker than its outer portion. In this respect this form of the invention is different from that shown in Fig. 2 wherein the rubber annulus is thicker adjacent its outer periphery than adjacent the central portion secured to the inner pipe 11.

However, the inclination of the lower surface 19 of the rubber annulus again provides an initial compression and shear load upon the rubber, when a load is placed upon the inner member 16 and results in the rubber being placed under tension when the inner member is depressed or deflected to a sufficient extent to pass a dead center position. The result is similar to that explained in connection with Figs. 1 and 2 in that after a certain load has been placed upon the inner member, the deflection increases rapidly relative to the increase in load which results in the absorption of a large amount of energy for a small increase in peak load.

Figure 5:
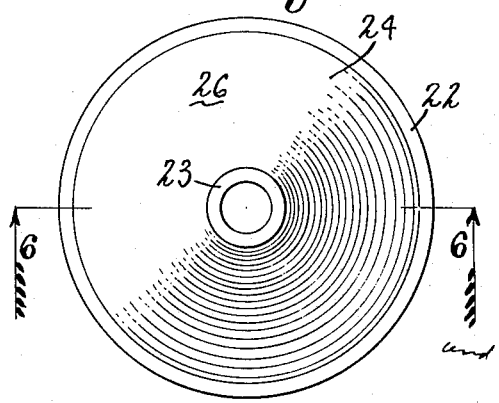
Fig. 5 is a top plan view of a further modification.
Figure 6:
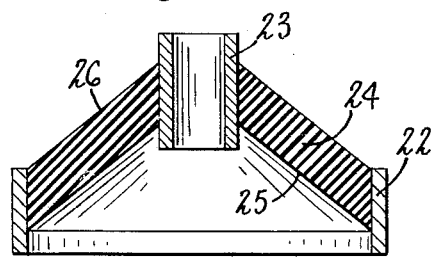
Fig. 6 is a sectional view on line 6—6 of Fig. 5.

A further modification is shown in Figs. 5 and 6 of the drawing wherein the outer member 22 has a relatively small vertical dimension and is joined to the inner member 23 by an annular portion of resilient rubber or rubber-like material 24. The lower end of the inner hollow cylindrical member 23 is disposed considerably above the lower end of the outer member 22 so that the lower surface 25 of the rubber annulus is inclined as before. In this case the vertical dimension of the rubber annulus is substantially the same throughout the distance between the inner and outer members so that the upper surface 26 has substantially the same slope as the lower surface 25. In this case also as with the two other forms of the invention, the point at which the lower surface of the rubber annulus is bonded to the outer member is below the point at which it is bonded to the inner member, a distance of from one third to one half of the diameter of the outer member 22.

In this instance also the result of a load placed upon the member 23 which is assumed to be the supported member will initially result in a compression and shear load upon the resilient rubber or rubber-like annulus 24, this force of compression changing to tension when the deflection becomes sufficiently great.

In all of the modifications of the invention disclosed, it has been found that when a load deflection curve is plotted, the curve will be substantially linear for loads up to a certain amount, that is, the deflection will be substantially proportional to the amount of the applied load. When, however, the applied load is above a given figure it has been found that the deflection increases much more rapidly, resulting in a flattening out of the load deflection curve, as is desirable.

While we have shown and described some preferred embodiments of our invention, it is not to be limited to all the details shown, but is capable of modification and variation within the spirit of the invention and within the scope of the appended claim.

What we claim is:

A shock-absorbing mounting comprising an outer hollow member, an inner member having its outer surface in spaced relation to the outer member and partly embraced therewithin, a body of resilient material between said members and bonded to both thereof, the lower surface of said body being inclined upwardly and inwardly in substantially cone-frustum form, and the upper surface of the body being inclined upwardly and inwardly at a steeper angle than the lower surface to give the body a greater axial dimension adjacent said inner member than adjacent the outer member, said outer member being unobstructed at both ends thereof to permit the body of resilient material to be forced through the lower open end of said member under load, the portion of said inner member embedded in the resilient material being substantially cylindrical over a substantial portion of its length from its outer ends inwardly and having a bulbous portion between said cylindrical portions, and said bulbous portion lying above said outer member when said inner member is not under load.

References Cited in the file of this patent

UNITED STATES PATENTS

| 2,047,976 | Lord | July 21, 1936 |

FOREIGN PATENTS

| 260,025 | Switzerland | July 1, 1949 |
| 621,441 | Great Britain | Apr. 8, 1948 |
| 621,693 | Great Britain | Apr. 14, 1949 |